United States Patent
Ogasawara et al.

(10) Patent No.: US 11,209,779 B2
(45) Date of Patent: Dec. 28, 2021

(54) TIMEPIECE AND TIMEPIECE MOTOR CONTROL METHOD

(71) Applicant: Seiko Instruments Inc., Chiba (JP)

(72) Inventors: Kenji Ogasawara, Chiba (JP); Tamotsu Maesawa, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 18 days.

(21) Appl. No.: 16/736,444

(22) Filed: Jan. 7, 2020

(65) Prior Publication Data
US 2020/0225620 A1   Jul. 16, 2020

(30) Foreign Application Priority Data
Jan. 11, 2019   (JP) .............................. JP2019-003262

(51) Int. Cl.
*G04C 3/14* (2006.01)
*H02P 8/02* (2006.01)

(52) U.S. Cl.
CPC ................ *G04C 3/143* (2013.01); *H02P 8/02* (2013.01)

(58) Field of Classification Search
CPC .. H02P 8/02; H02P 23/24; G04C 3/14; G04C 3/143
See application file for complete search history.

(56) References Cited

U.S. PATENT DOCUMENTS

| | | | | |
|---|---|---|---|---|
| 4,272,837 A | * | 6/1981 | Ueda | G04C 3/143 368/217 |
| 4,533,257 A | * | 8/1985 | Kitano | G04C 3/143 368/157 |
| 5,550,795 A | * | 8/1996 | Takakura | G04C 3/143 318/696 |
| 7,606,116 B2 | * | 10/2009 | Manaka | H02P 8/02 318/696 |
| 8,319,468 B2 | * | 11/2012 | Manaka | H02P 8/34 318/685 |
| 8,569,991 B2 | | 10/2013 | Manaka et al. | |
| 8,698,443 B2 | | 4/2014 | Hasegawa | |

FOREIGN PATENT DOCUMENTS

| | | | |
|---|---|---|---|
| JP | 2000-321376 A | | 11/2000 |
| JP | 2000-321376 A | | 11/2000 |
| JP | 2000321376 A | * | 11/2000 |

OTHER PUBLICATIONS

Extended European Search Report in Europe Application No. 19215211.4, dated Apr. 9, 2020, 6 pages.

* cited by examiner

*Primary Examiner* — Bickey Dhakal
(74) *Attorney, Agent, or Firm* — Crowell & Moring LLP

(57) ABSTRACT

There is provided a timepiece including a high-load rotation position detection unit that detects a high-load rotation position that is a rotation position of a wheel when a rotational load of a rotor that transmits rotor's rotation to the wheel and rotates a pointer clockwise is greater than that during normal hand movement and a drive signal output unit that outputs a sub-drive signal having energy greater than that of a main drive signal that is output during the normal hand movement and less than that of an auxiliary drive signal that is output when the rotor does not rotate by the main drive signal in a case where the rotation position of the wheel is the high-load rotation position.

12 Claims, 5 Drawing Sheets

FIG. 4

| ROTATIONAL LOAD OF ROTOR | ROTATIONAL BEHAVIOR OF ROTOR | INDUCED VOLTAGE INDUCED IN COIL | PATTERN OF INDUCED VOLTAGE | | |
|---|---|---|---|---|---|
| | | | PERIOD T1 | PERIOD T2 | PERIOD T3 |
| DURING NORMAL HAND MOVEMENT | | | 0 | 1 | 1 |
| SMALL LOAD | | | 1 | 1 | 1 |
| HEAVY LOAD | | | 1 | 0 | 1 |
| NO ROTATION | | | 1 | 0 | 0 |

TIMEPIECE AND TIMEPIECE MOTOR CONTROL METHOD

RELATED APPLICATIONS

This application claims priority to Japanese Patent Application No. 2019-003262 filed on Jan. 11, 2019, the entire content of which is incorporated herein by reference.

BACKGROUND OF TH E INVENTION

1. Field of the Invention

Embodiments of the present disclosure relate to a timepiece and a timepiece motor control method.

2. Description of the Related Art

Currently, a timepiece in which a pointer is driven by a stepping motor is widely used. For example, as an example of such a timepiece, an electronic timepiece in which a first auxiliary drive pulse is output when a rotor does not rotate with a normal drive pulse and a second auxiliary drive pulse is output when the rotor does not rotate with the first auxiliary drive pulse is disclosed in Japanese Patent No. 3625395.

However, in the electronic timepiece, a first drive pulse and a second drive pulse having power consumption greater than that of the normal drive pulse are output when a rotational load of the rotor is greater than that during normal hand movement, and thus power consumption may be increased.

The present disclosure has been made in view of the problems described above, and an object thereof is to provide a timepiece and a timepiece motor control method capable of reducing power consumption.

SUMMARY OF THE INVENTION

In order to achieve the object, a timepiece according to an aspect of the present disclosure includes a high-load rotation position detection unit that detects a high-load rotation position that is a rotation position of a wheel when a rotational load of a rotor that transmits rotor's rotation to the wheel to rotate a pointer clockwise is greater than that during normal hand movement and a drive signal output unit that outputs a sub-drive signal having energy greater than that of a main drive signal that is output during the normal hand movement and less than that of an auxiliary drive signal that is output when the rotor does not rotate by the main drive signal in a case where the rotation position of the wheel is the high-load rotation position.

The timepiece according to the aspect of the present disclosure further includes a rotation detection control unit that stops a rotation detection process for detecting a rotation state of the rotor based on an induced voltage output to a coil that generates magnetic flux for rotating the rotor in a case where the rotation position of the wheel is the high-load rotation position.

In the timepiece according to the aspect of the present disclosure, the drive signal output unit increases energy of the main drive signal when a rotation position different from a reference rotation position corresponds to the high-load rotation position and the reference rotation position corresponds to the high-load rotation position.

In the timepiece according to the aspect of the present disclosure, the drive signal output unit maintains energy of the main drive signal when a rotation position different from a reference rotation position corresponds to the high-load rotation position and the reference rotation position does not correspond to the high-load rotation position.

In the timepiece according to the aspect of the present disclosure, the drive signal output unit increases the energy of the main drive signal when the rotation position of the wheel continuously corresponds to the high-load rotation position by exceeding a predetermined number.

In order to achieve the object, a timepiece motor control method according to another aspect of the present disclosure includes a high-load rotation position detecting step of detecting a high-load rotation position that is a rotation position of a wheel when a rotational load of a rotor that transmits rotor's rotation to the wheel and rotates a pointer clockwise is greater than that during normal hand movement and a drive signal outputting step of outputting a sub-drive signal energy greater than that of a main drive signal that is output during the normal hand movement and less than that of an auxiliary drive signal that is output when the rotor does not rotate by the main drive signal in a case where the rotation position of the wheel is the high-load rotation position.

BRIEF DESCRIPTION OF THE DRAWINGS

FIG. 4 is a diagram illustrating an example of a correspondence relationship between a rotational load of a rotor according to the embodiment, rotational behavior of the rotor, an induced voltage induced in a coil, and a pattern of the induced voltage.

DETAILED DESCRIPTION OF THE PREFERRED EMBODIMENTS

Figure 1:
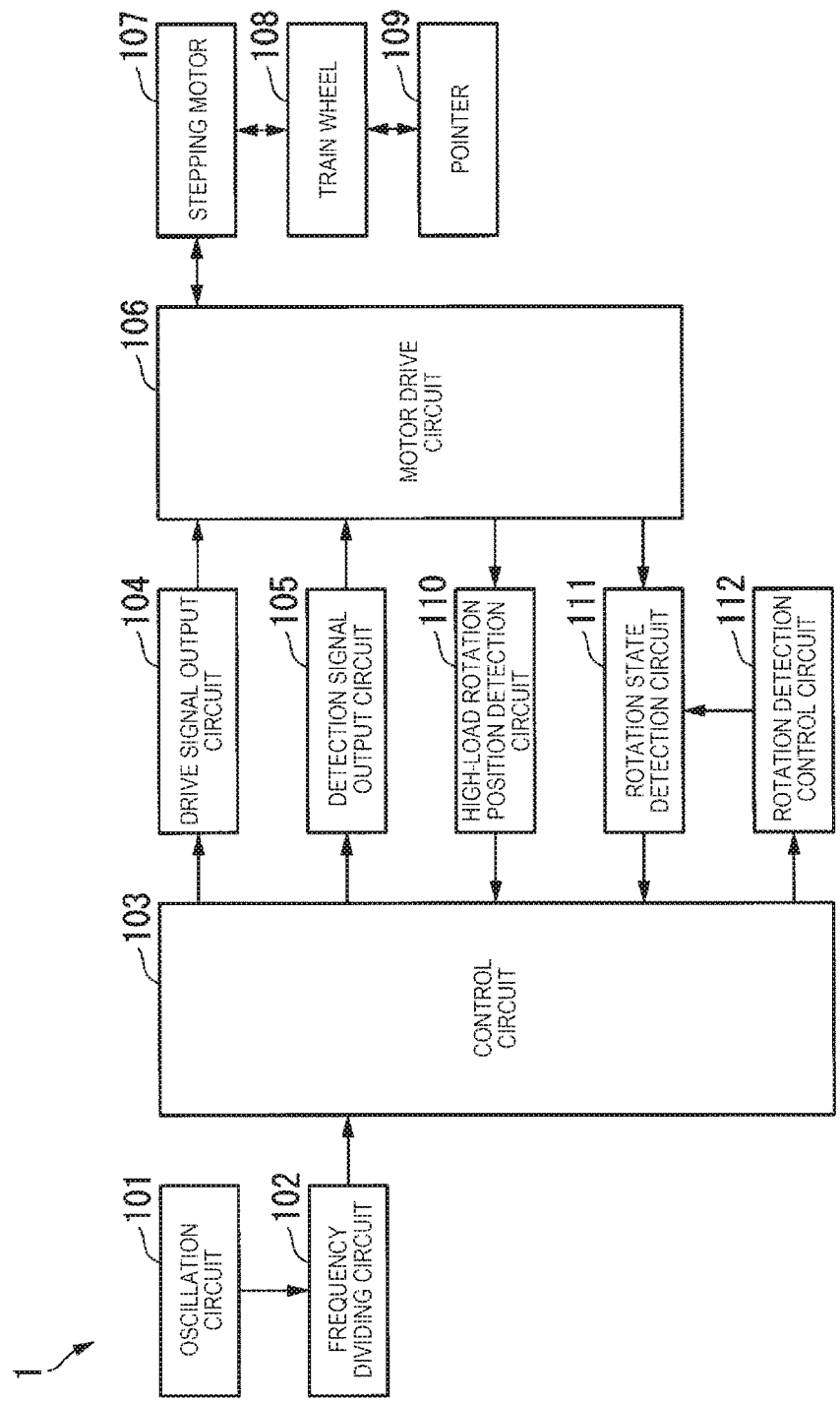
FIG. 1 is a diagram illustrating an example of a configuration of a timepiece according to an embodiment.

An example of a timepiece according to an embodiment will be described with reference to FIGS. 1 to 4. FIG. 1 is a diagram illustrating an example of a configuration of a timepiece according to the embodiment. As illustrated in FIG. 1, a timepiece 1 includes an oscillation circuit 101, a frequency dividing circuit 102, a control circuit 103, a drive signal output circuit 104, a detection signal output circuit 105, a motor drive circuit 106, and a stepping motor 107, a train wheel 108, a pointer 109, a high-load rotation position detection circuit 110, a rotation state detection circuit 111, and a rotation detection control circuit 112.

The oscillation circuit 101 generates a signal having a predetermined frequency and transmits the signal to the frequency dividing circuit 102. The frequency dividing circuit 102 divides the signal received from the oscillation circuit 101 to generate a timepiece signal that serves as a reference for time measurement and transmits the clock signal to the control circuit 103. The control circuit 103 transmits a control signal to respective parts of the timepiece 1 based on the timepiece signal received from the frequency dividing circuit 102, and controls operations of the respective parts of the timepiece 1.

The drive signal output circuit 104 generates a main drive signal, an auxiliary drive signal, or a sub-drive signal based on the control signal received from the control circuit 103 and outputs the main drive signal, the auxiliary drive signal, or the sub-drive signal to the motor drive circuit 106.

The main drive signal is a signal that is output during normal hand movement for the purpose of rotating a rotor 202 of the stepping motor 107, which will be described later, in one step, that is, 180 degrees in the forward-rotation direction. The main drive signal is, for example, a comb-tooth shaped or rectangular voltage pulse. Here, the forward-rotation direction is a direction in which the rotor 202 described later rotates in order to rotate the pointer 109 clockwise. On the other hand, the reverse rotation direction is a direction opposite to the normal rotation direction.

The auxiliary drive signal is a signal that is output when the rotor 202 of the stepping motor 107, which will be described later, does not rotate in the forward-rotation direction by the main drive signal, and is a signal that has greater energy than the main drive signal. The auxiliary drive signal is, for example, a comb-tooth shaped or rectangular voltage pulse having a duty ratio greater than that of the main drive signal.

The sub-drive signal is a signal that is output when the rotation position of wheels constituting the train wheel 108 becomes a high-load rotation position, and has greater energy than that of the main drive signal, and less energy than that of the auxiliary drive signal. The sub-drive signal is, for example, a comb-tooth shaped or rectangular voltage pulse having a duty ratio greater than that of the main drive signal and less than that of the auxiliary drive signal.

The rotation position referred to here means the direction of each wheel when the pointer 109 indicates each value carved on the dial. In each of the wheels constituting the train wheel 108, some teeth may have different shapes from the other teeth, or some of the teeth may have lubricating oil having increased viscosity attached thereto. For that reason, the direction of each wheel is conceivable. In the following description, a rotation position when a tooth having a different shape from the other teeth meshes with the other teeth is referred to as a reference rotation position. The train wheel 108 is designed such that the rotation position when a second hand, which is an example of the pointer 109, is directed toward the 12 o'clock direction is the reference rotation position. Details of the drive signal output circuit 104 will be described later.

The detection signal output circuit 105 outputs a chopper signal to the motor drive circuit 106 for the purpose of detecting the rotation state of the rotor 202 and the purpose of detecting the rotational load of the rotor 202. The rotational load of the rotor 202 varies depending on the direction of the pointer 109. Factors that cause the rotational load of the rotor 202 to fluctuate include, for example, how the teeth of the wheels constituting the train Wheel 108 mesh, a shape of the teeth, a degree of tooth wear, viscosity of lubricating oil adhering to each tooth, weight of the pointer 109, a relationship between the direction of gravity and the direction of the timepiece 1, and an absolute value of an external magnetic field. Details of the detection signal output circuit 105 will be described later.

Figure 2:
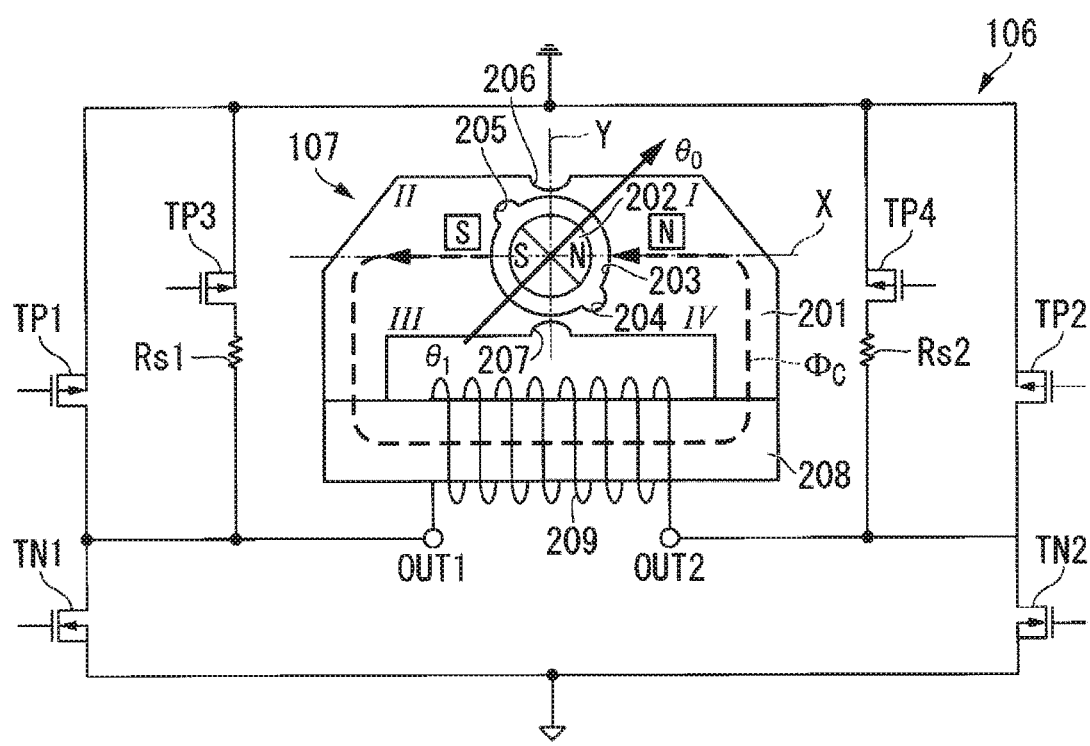
FIG. 2 is a diagram illustrating an example of a motor drive circuit and a stepping motor according to the embodiment.

FIG. 2 is a diagram illustrating an example of a motor drive circuit and a stepping motor according to the embodiment. As illustrated in FIG. 2, the motor drive circuit 106 includes a transistor TP1, a transistor TP2, a transistor TP3, a transistor TP4, a transistor TN1, a transistor IN2, a detection resistor Rs1, a detection resistor Rs2, and a terminal OUT1, and a terminal OUT2.

The transistors TP1, TP2, TP3 and TP4 are P-channel metal-oxide-semiconductor field-effect transistors (MOSFETs) that are turned ON when a low level gate signal is applied and turned OFF when a high level gate signal is applied. The transistors TN1 and TN2 are N-channel MOSFETs that are turned OFF when the low level gate signal is applied and turned ON when the high level gate signal is applied. High level potential is potential equal to VDD that is a power supply voltage of the motor drive circuit 106. Low level potential is 0 V or potential equal to a reference voltage VSS.

Sources of the transistor TP1, the transistor TP2, the transistor TP3, and the transistor TP4 are electrically connected to each other, and are supplied the VDD that is the power supply voltage of the motor drive circuit 106. A drain of the transistor TP3 is electrically connected to one end of the detection resistor Rs1. A drain of the transistor TP1, a drain of the transistor TN1, and the other end of the detection resistor Rs1 are electrically connected to the terminal OUT1. A drain of the transistor TP4 is electrically connected to one end of the detection resistor Rs2. Further, a drain of the transistor TP2, a drain of the transistor TN2, and the other end of the detection resistor Rs2 are electrically connected to the terminal OUT2. The sources of the transistors TN1 and TN2 are electrically connected to each other, and supplied with 0 V or VSS which is a reference voltage. A terminal OUT1 and a terminal OUT2 are connected to an input terminal of a comparator (not illustrated). Furthermore, a reference voltage Vcomp described later is input to a reference input terminal of the comparator.

As illustrated in FIG. 2, the stepping motor 107 includes a stator 201, the rotor 202, a rotor accommodating through-hole 203, an inner notch 204, an inner notch 205, an outer notch 206, an outer notch 207, and a coil core 208, and a coil 209.

The stator 201 is a member that is curved in a U shape and is made of a magnetic material. The rotor 202 is formed in a columnar shape, and is inserted in a rotatable state with respect to the rotor accommodating through-hole 203 formed in the stator 201. Since the rotor 202 is magnetized, the rotor 202 has an N-pole and an S-pole. The rotor 202 rotates the pointer 109 clockwise through the train wheel 108 by rotating in the forward-rotation direction.

The inner notch 204 and the inner notch 205 are cutouts formed on a wall surface of the rotor accommodating through-hole 203 and determine a stop position of the rotor 202 with respect to the stator 201. That is, for example, as illustrated in FIG. 2, when the coil 209 is not excited, the rotor 202 stops at a position where a magnetic pole axis is orthogonal to a line segment connecting the inner notch 204 and the inner notch 205.

The outer notch 206 and the outer notch 207 are cutouts formed on the outer side and the inner side of the curved stator 201, respectively, and form a supersaturated portion with the rotor accommodating through-hole 203. Here, the supersaturated portion is a portion where magnetic saturation occurs and magnetic resistance is increased when the coil 209 is excited without being magnetically saturated by the magnetic flux of the rotor 202.

The coil core 208 is a rod-shaped member made of a magnetic material, and is joined to both ends of the stator 210. The coil 209 is wound around the coil core 208, and one end thereof is connected to the terminal OUT1 and the other end is connected to the terminal OUT2.

Figure 3:
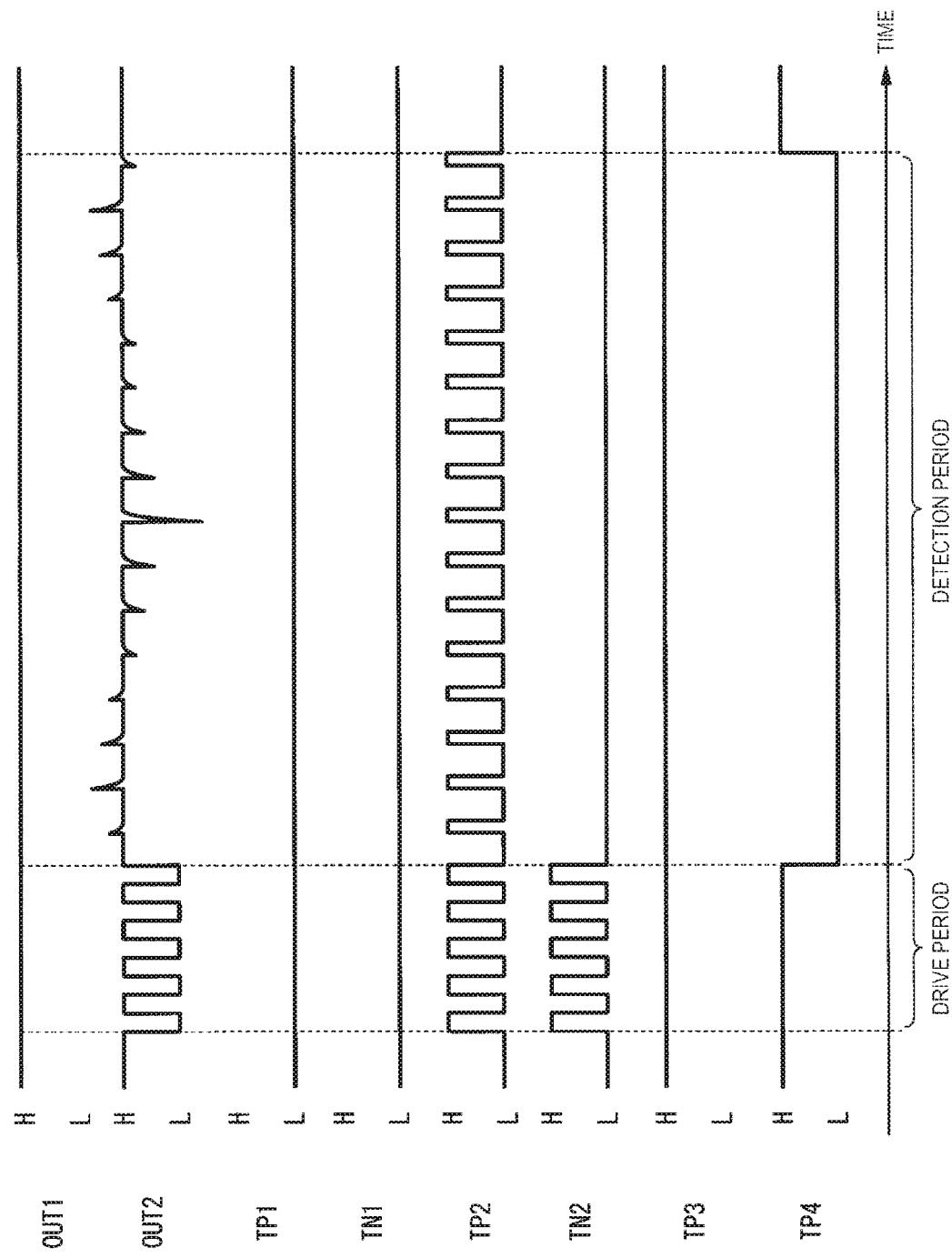
FIG. 3 is a diagram illustrating an example of a signal applied to a gate of a transistor in a drive period and a detection period by the timepiece according to the embodiment.

FIG. 3 is a diagram illustrating an example of a signal applied to a gate of a transistor in a drive period and a detection period by the timepiece according to the embodiment. The drive period is a period during which the drive signal output circuit 104 outputs the main drive signal or the sub-drive signal for the purpose of rotating the rotor 202 one step in the forward-rotation direction. The detection period is a period that follows the drive period, and is a period during which the detection signal output circuit 105 outputs a chopper signal for the purpose of detecting the rotation state of the rotor 202 and the purpose of detecting the rotational load of the rotor 202.

For example, as illustrated in FIG. 2, a case where the magnetic pole axis of the rotor 202 is stationary in a state of being orthogonal to a line segment connecting the inner notch 204 and the inner notch 205 is considered. In this case, the drive signal output circuit 104 applies the gate signal illustrated in FIG. 3 to the transistors TP1, TP2, TP3, TP1, TN1, and TN2 during the drive period.

With this configuration, the transistor TP1 is turned ON when a low level gate signal is applied thereto. The transistors TP3 and TP4 are turned OFF when a high level gate signal is applied thereto. The transistor TN1 is turned OFF when the low-level gate signal is applied thereto. Furthermore, the transistor TP2 and the transistor TN2 are repeatedly turned ON and OFF by applying a comb-tooth shaped gate signal thereto.

By such an operation of the transistor, as illustrated in FIG. 3, the voltage at the terminal OUT1 becomes high level, and a comb-tooth shaped main drive signal is output to the terminal OUT2. As illustrated in FIG. 2, a drive current flows through a path of the VDD, transistor TP1, terminal OUT1, coil 209, terminal OUT2, transistor TN2, and VSS, and magnetic flux $\Phi_C$ is generated in the coil 209. The N-pole and S-pole of the rotor 202 repel the N-pole and S-pole generated in the stator 201 by the magnetic flux $\Phi_C$, respectively. With this configuration, the rotor 202 rotates counterclockwise from a state in which the N-pole is directed in the $\theta_0$ direction illustrated in FIG. 2 to a state in which the N-pole is directed in the $\theta_1$ direction. This rotation is an example of one-step rotation in the forward-rotation direction.

When the N-pole of the rotor 202 is directed in the $\theta 1$ direction, the drive signal output circuit 104 applies the gate signal described below to the transistor TP1, transistor TP2, transistor TP3, transistor TP4, transistor TN1, and transistor TN2 during the drive period.

With this configuration, the transistor TP2 receives the low level gate signal and is turned ON. The transistors TP3 and TP4 receive a high level gate signal and are turned OFF. The transistor TN2 receives a low level gate signal and is turned OFF. Furthermore, the transistor TP1 and the transistor TN1 receive a comb-tooth shaped gate signal and are repeatedly turned ON and OFF.

By such an operation of the transistor, the voltage at the terminal OUT2 becomes high level, and a comb-tooth shaped main drive signal is output to the terminal OUT1. A drive current flows through a path of VDD, transistor TP2, terminal OUT2, coil 209, terminal OUT1, transistor TN1, and VSS, and a magnetic flux in the direction opposite to the magnetic flux $\Phi_C$ is generated in coil 209. The N-pole and S-pole of the rotor 202 repel the N-pole and S-pole generated in the stator 201 by the magnetic flux, respectively. With this configuration, the rotor 202 rotates counterclockwise from the state in which the N-pole is oriented in the $\theta_1$ direction illustrated in FIG. 2 to the state in which the N-pole is oriented in the $\theta_1$ direction. This rotation is an example of one-step rotation in the forward-rotation direction.

Next, the detection signal output circuit 105 applies, for example, the gate signal illustrated in FIG. 3 to the transistor TP1, the transistor TP2, the transistor TP3, the transistor TP4, the transistor TN1, and the transistor TN2 in the detection period illustrated in FIG. 3.

With this configuration, the transistors TP1 and TP4 receive the low level gate signal and are turned ON. The transistor TP3 receives the high level gate signal and is turned OFF. The transistors TN1 and TN2 receive the low level gate signal and are turned OFF. The transistor TP2 receives the comb-tooth shaped gate signal and is repeatedly turned ON and OFF.

By such an operation of the transistor, as illustrated in FIG. 3, a spike-shaped voltage response is output to the terminal OUT2 while the voltage at the terminal OUT1 becomes a high level and the rotor 202 continues to rotate. This spike-shaped voltage response is a response obtained by amplifying and detecting an induced current flowing in the same direction as the drive current using a chopper signal. Among the spike-shaped voltage responses, a voltage response higher than the high level is limited to a certain level or less by a parasitic diode of the transistor TP2. A process for amplifying a signal with a chopper signal is called chopper amplification.

The train wheel 108 includes at least one wheel that transmits rotation of the rotor 202 to the pointer 109. The pointer 109 includes an hour hand, a minute hand, a second hand and other hands.

FIG. 4 is a diagram illustrating an example of a correspondence relationship between the rotational load of the rotor according to the embodiment, rotational behavior of the rotor, an induced voltage induced in the coil, and a pattern of the induced voltage. In the following description, Quadrant I, Quadrant II Quadrant III, and Quadrant IV illustrated in FIGS. 2 and 4 are used. Quadrant I, Quadrant II, Quadrant III, and Quadrant IV are divided by the X and Y directions illustrated in FIG. 2, and horizontal magnetic pole is positioned at the boundary between Quadrant II and Quadrant III and at the boundary between Quadrant IV and Quadrant I. In the following description, a period P1, a period T1, a period T2, and a period T3 illustrated in the second and third columns from the left in FIG. 4 are used. The period P1 is a period during which the main drive signal is output. The periods T1, T2, and T3 are periods during which a chopper signal is output. A high-load rotation position detection circuit 110 executes a process for explaining all or some of the possible directions of the pointer 109 with reference to FIG. 4.

As illustrated in the second row from the top in FIG. 4, when the rotational load of the rotor 202 is approximately the same as that during normal hand movement, during the period P1, the rotor 202 rotates in the forward-rotation direction from a state where the N-pole is directed in the direction of $\theta_0$ to a state where the N-pole is directed to Quadrant III. Next, during the period T1, the rotor 202 rotates in the forward-rotation direction from the state where the N-pole is directed to Quadrant III to a state where the N-pole is directed in front of the outer notch 207, and stops. Then, during the period T2, the rotor 202 rotates in the reverse-rotation direction from the state in which the N-pole is directed in front of the outer notch 207 toward the boundary between Quadrant II and Quadrant III.

In this case, as illustrated in the second row from the top in FIG. 4, an induced voltage equal to or less than the reference voltage Vcomp is induced in the period T1, an induced voltage exceeding the reference voltage Vcomp is induced in the period T2, and an induced voltage equal to or less than the reference voltage Vcomp is induced in the period T3. However, in this case, an induced voltage exceeding the reference voltage Vcomp may be induced in the period T3.

That is, in this case, the pattern of the induced voltage becomes "0" in the period T1, becomes "1" in the period T2, and becomes "–" in the period T3, as illustrated in the fourth column from the left in the second row from the top in FIG. 4. In FIG. 4, a case where the induced voltage equal to or less than the reference voltage Vcomp is induced is indicated by "0", a case where the induced voltage exceeding the reference voltage Vcomp is induced is indicated by "1", and a case where a magnitude relationship between the induced voltage and the reference voltage Vcomp does not matter is indicated by "–". When the induced voltage is induced in the pattern illustrated in the fourth column from the left in the second row from the top in FIG. 4, the high-load rotation position detection circuit 110 determines that the rotational load in the current direction of the pointer 109 is approximately the same as that during normal hand movement, and stores the determination result in a storage medium. Then, when the pointer 109 is in the direction next, the drive signal output circuit 104 outputs the main drive signal.

As illustrated in the third row from the top in FIG. 4, when the rotational load of the rotor 202 is equal to the sum of the rotational load during normal hand movement and a relatively small rotational load, during the period P1, the rotor 202 rotates in the forward-rotation direction from the state in which the N-pole is directed in the direction of $\theta_0$ to a state in which the N-pole is directed between the inner notch 205 and the horizontal magnetic pole. Next, during the period T1, the rotor 202 rotates in the forward-rotation direction from the state where the N-pole is directed between the inner notch 205 and the horizontal magnetic pole to a state where the N-pole is directed in front of the outer notch 207, and stops. Then, during the period T2, the rotor 202 rotates in the reverse-rotation direction from the state in which the N-pole is directed in front of the outer notch 207 toward the boundary between Quadrant II and Quadrant III.

In this case, as illustrated in the third row from the top in FIG. 4, the induced voltage exceeding the reference voltage Vcomp is induced in the period. T1, the induced voltage exceeding the reference voltage Vcomp is induced in the period T2, and the induced voltage equal to or less than the reference voltage Vcomp is induced in the period T3. However, in this case, the induced voltage exceeding the reference voltage Vcomp may be induced in the period T3.

That is, in this case, the pattern of the induced voltage becomes "1" in the period T1, becomes "1" in the period T2, and becomes "–" in the period T3, as illustrated in the fourth column from the left in the third row from the top in FIG. 4. When the induced voltage is induced in the pattern illustrated in the fourth column from the left in the third row from the top in FIG. 4, the high-load rotation position detection circuit 110 determines that the rotational load in the current direction of the pointer 109 is equal to the sum of the rotational load during normal hand movement and a relatively small rotational load. That is, the high-load rotation position detection circuit 110 determines that the rotation position of the wheel in the current direction of the pointer 109 is the high-load rotation position. This determination result is stored in the storage medium. As an example of the case of determining in this way, for example, a case where lubricating oil having increased viscosity is adhered to some teeth when the reference rotation position is reached may be included. Then, when the pointer 109 is in the direction next, the drive signal output circuit 104 outputs a sub-drive signal instead of outputting the main drive signal.

As illustrated in the fourth row from the top in FIG. 4, when the rotational load of the rotor 202 is equal to the sum of the rotational load during normal hand movement and a relatively large rotational load, during the period P1, the rotor 202 rotates in the forward-rotation direction from the state where the N-pole is directed in the direction of $\theta_0$ to a state where the N-pole is directed near the inner notch 205. Next, during the period T1, the rotor 202 rotates in the forward-rotation direction from the state where the N-pole is directed near the inner notch 205 to a state where the N-pole is directed in a direction substantially parallel to the horizontal magnetic pole. Thereafter, during the period T2, the rotor 202 rotates in the forward-rotation direction from the state in which the N-pole is directed in the direction substantially parallel to the horizontal magnetic pole to a state in which the N-pole is directed in front of the outer notch 207, and stops. Then, during the period T2, the rotor 202 rotates in the reverse-rotation direction from the state in which the N-pole is directed in front of the outer notch 207 toward the boundary between Quadrant II and Quadrant III.

In this case, as illustrated in the fourth row from the top in FIG. 4, the induced voltage exceeding the reference voltage Vcomp is induced in the period T1, the induced voltage equal to or less than the reference voltage Vcomp is induced in the period T2, and the induced voltage exceeding the reference voltage Vcomp is induced in the period T3. However, in this case, the induced voltage equal to or less than the reference voltage Vcomp may be induced in the period T1.

That is, in this case, as illustrated in the fourth column from the left in the fourth row from the top in FIG. 4, the pattern of the induced voltage becomes in the period T1, becomes "0" in the period T2, and becomes "1" in the period T3. When the induced voltage is induced in the pattern illustrated in the fourth column from the left in the fourth row from the top in FIG. 4, the high-load rotation position detection circuit 110 determines that the rotational load in the current direction of the pointer 109 is equal to the sum of the rotational load during normal hand movement and a relatively large rotational load. That is, the high-load rotation position detection circuit 110 determines that the rotation position of the wheel in the current direction of the pointer 109 is the high-load rotation position. This determination result is stored in the storage medium. As an example of the case of determining in this way, for example, the case where lubricating oil having increased viscosity is adhered to some teeth when the reference rotation position is reached may be included. Then, when the pointer 109 is in the direction next, the drive signal output circuit 104 outputs the sub-drive signal instead of outputting the main drive signal.

As illustrated in the fifth row from the top in FIG. 4, when the rotational load of the rotor 202 is large and the rotor 202 cannot rotate 180 degrees in the forward-rotation direction, during the period P1, the rotor 202 rotates in the forward-rotation direction from the state where the N-pole is directed in the direction of $\theta_0$ to the state where the N-pole is directed near the outer notch 206. Next, during the period T1, the rotor 202 rotates in the forward-rotation direction from the state where the N-pole is directed near the outer notch 206 until rotation speed becomes zero. Thereafter, during the period T2, the rotor 202 rotates in the reverse-rotation direction from the state where the rotational speed is zero to the state where the N-pole is directed near the direction of $\theta_0$. Then, during the period T3, the rotor 202 rotates in the forward-rotation direction from the state where the N-pole is directed near the direction of $\theta_0$.

In this case, as illustrated in the fifth row from the top in FIG. 4, the induced voltage exceeding the reference voltage Vcomp is induced in the period T1, the induced voltage equal to or less than the reference voltage Vcomp is induced in the period T2, and the induced voltage equal to or less than the reference voltage Vcomp is induced in the period T3. However, in this case, the induced voltage equal to or less than the reference voltage Vcomp may be induced in the period T1.

That is, in this case, as illustrated in the fourth column from the left in the fifth row from the top in FIG. 4, the pattern of the induced voltage becomes "−" in the period T1, becomes "0" in the period T2, and becomes "0" in the period T3. When the induced voltage is induced in the pattern illustrated in the fourth column from the left of the fifth row from the top in FIG. 4, the high-load rotation position detection circuit 110 determines that the rotor 202 has not rotated 180 degrees in the forward-rotation direction in the current direction of the pointer 109, and stores this determination result in the storage medium. Then, the drive signal output circuit 104 outputs an auxiliary drive signal and rotates the rotor 202 by 180 degrees in the forward-rotation direction. When the pointer 109 is in the direction next, the drive signal output circuit 104 outputs the auxiliary drive signal after outputting the main drive signal.

When there is a high-load rotation position periodically detected by the method described with reference to FIG. 4, the high-load rotation position detection circuit 110 sets the high-load rotation position as the reference rotation position. Further, the high-load rotation position detection circuit 110 determines whether or not there are a plurality of rotation positions corresponding to the high-load rotation position.

The drive signal output circuit 104 controls magnitude of energy of the main drive signal based on the determination result of the high-load rotation position detection circuit 110. Specifically, the drive signal output circuit 104 controls the magnitude of energy of the main drive signal by changing the duty ratio of the main drive signal. For example, when energy of the main drive signal is increased due to a high voltage of the battery built in the timepiece 1, the rotor 202 may rotate 180 degrees in the forward-rotation direction even if the rotational load of the rotor 202 is slightly increased. Therefore, in such a case, the drive signal output circuit 104 reduces the duty ratio of the main drive signal and reduces energy of the main drive signal. With this configuration, the induced voltage induced in the coil 209 according to the rotational load of the rotor 202 is divided into appropriate patterns as illustrated in FIG. 4, and thus the high-load rotational position detection circuit 110 can detect the rotational load with high accuracy.

The drive signal output circuit 104 increases the energy of the main drive signal when the rotation position different from the reference rotation position corresponds to the high-load rotation position and the reference rotation position corresponds to the high-load rotation position. As an example of such a case, a case where, due to adhesion of lubricating oil having increased viscosity to the wheel teeth, the magnitude of the rotational load when the teeth mesh with other teeth is equal to or less than the magnitude of the rotational load at the reference rotation position may be included.

The drive signal output circuit 104 maintains the energy of the main drive signal when the rotation position different from the reference rotation position corresponds to the high-load rotation position and the reference rotation position does not correspond to the high-load rotation position. As an example of such a case, a case where, due to adhesion of lubricating oil having increased viscosity to the wheel teeth, the rotational load when the teeth meshes with other teeth is greater than the rotational load at the reference rotation position, and the rotational load at the reference rotation position has been detected as a rotational load which is approximately the same as that during normal hand movement may be included.

The drive signal output circuit 104 increases the energy of the main drive signal when the rotation position of the wheel exceeds the predetermined number and corresponds to the high load rotation position continuously. As an example of such a case, a case where, due to adhesion of lubricating oil having increased viscosity to continuously arranged teeth, the magnitude of the rotational load when these teeth mesh with other teeth is equal to or greater than the magnitude of the rotational load at the reference rotation position may be included.

The rotation state detection circuit 111 executes a rotation detection process for detecting the rotation state of the rotor 202 based on the spike-shaped voltage response obtained by chopper amplification and the reference voltage Vcomp.

The rotation detection control circuit 112 stops the rotation detection process based on the induced voltage output to the coil 209 that generates magnetic flux for rotating the rotor 202, when the rotation position of the wheel becomes the high-load rotation position. That is, the rotation detection control circuit 112 stops output of the chopper signal by the detection signal output circuit 105 when the direction of the pointer 109 becomes the direction indicated by the determination result stored in the storage medium by the high-load rotation position detection circuit 110.

Figure 5:
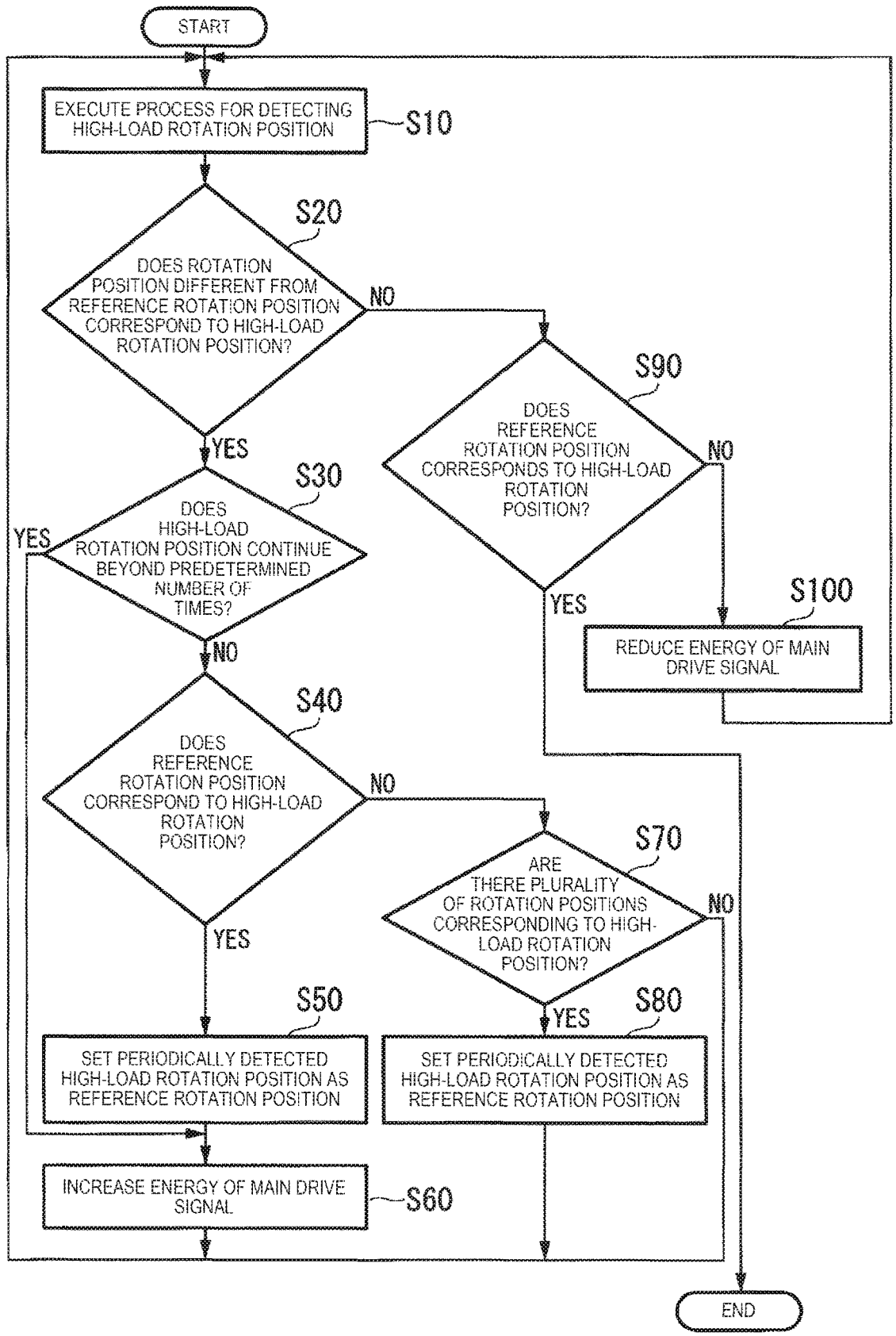
FIG. 5 is a flowchart illustrating an example of a process executed by the timepiece according to the embodiment.

Next, an example of the operation of the timepiece according to the embodiment will be described with reference to FIG. 5. FIG. 5 is a flowchart illustrating an example of a process executed by the timepiece according to the embodiment.

In step S10, the high-load rotation position detection circuit 110 executes a process for detecting a high-load rotation position, and the process proceeds to step S20.

In step S20, the high-load rotation position detection circuit 110 determines whether or not the rotation position different from the reference rotation position corresponds to the high-load rotation position. When it is determined that the rotation position different from the reference rotation position corresponds to the high-load rotation position (YES in step S20), the high-load rotation position detection circuit 110 causes the process to proceed to step S30, and when it is determined that the rotation position different from the reference rotation position does not correspond to the high-load rotation position (NO in step S20), the high-load rotation position detection circuit 110 causes the process to proceed to step S90.

In step S30, the high-load rotation position detection circuit 110 determines whether or not the high-load rotation position continues beyond a predetermined number of times. When it is determined that the high-load rotation position continues beyond the predetermined number of times (YES in step S30), the high-load rotation position detection circuit 110 causes the process to proceed to step S60, and when it is determined that the high-load rotation position does not continue beyond the predetermined number of times (NO in step S30), the high-load rotation position detection circuit 110 causes the process to proceed to step S40.

In step S40, the high-load rotation position detection circuit 110 determines whether or not the reference rotation position corresponds to the high-load rotation position. When it is determined that the reference rotation position corresponds to the high-load rotation position (YES in step S40), the high-load rotation position detection circuit 110 causes the process to proceed to step S50, and when it is determined that the reference rotation position does not correspond to the high-load rotation position (NO in step S40), the high-load rotation position detection circuit 110 causes the process to proceed to step S70.

In step S50, the high-load rotation position detection circuit 110 sets the periodically detected high-load rotation position as the reference rotation position, and causes the process to proceed to step S60.

In step S60, the drive signal output circuit 104 increases the energy of the main drive signal, and causes the process to return to step S10.

In step S70, the high-load rotation position detection circuit 110 determines whether or not there are a plurality of rotation positions corresponding to the high-load rotation position. When it is determined that there are a plurality of rotation positions corresponding to the high-load rotation position (YES in step S70), the high-load rotation position detection circuit 110 causes the process to proceed to step S80, and when it is determined that there are not a plurality of rotation positions corresponding to the high-load rotation position (NO in step S70), the high-load rotation position detection circuit 110 causes the process to return to step S10.

In step S80, the high-load rotation position detection circuit 110 sets the periodically detected high-load rotation position as the reference rotation position, and causes the process to return to step S10.

In step S90, the high-load rotation position detection circuit 110 determines whether or not the reference rotation position corresponds to the high-load rotation position. When it is determined that the reference rotation position corresponds to the high-load rotation position (YES in step S90), the high-load rotation position detection circuit 110 ends the process, and when it is determined that the reference rotation position does not correspond to the high-load rotation position (NO in step S90), the high-load rotation position detection circuit 110 causes the process to proceed to step S100.

In step S100, the drive signal output circuit 104 reduces the energy of the main drive signal, and causes the process to return to step S10.

The timepiece 1 according to the embodiment has been described as above. The timepiece 1 detects the high-load rotation position, and outputs the sub-drive signal that has greater energy than the main drive signal and less energy than the auxiliary drive signal when the rotation position of the wheel becomes the high-load rotation position. With this configuration, the timepiece 1 outputs the main drive signal at a rotation position where the rotational load of the rotor 202 is approximately the same as that during normal hand movement and outputs the sub-drive signal instead of the auxiliary drive signal at the high-load rotation position. Accordingly, in the timepiece 1, it is possible to suppress power consumption since the drive signal with large energy more than necessary is prevented from being output when the rotor 202 is rotated in the forward-rotation direction to rotate the pointer 109 clockwise.

In the timepiece 1, when the rotation position of the wheel becomes the high-load rotation position, the rotation detection process for detecting the rotation state of the rotor 202 based on the induced voltage output to the coil 209 is stopped. Accordingly, in the timepiece 1, it is possible to suppress power consumption since the chopper signal is prevented from being output at the high-load rotation position that is known in advance that the main drive signal cannot rotate the rotor 202 180 degrees in the forward-rotation direction.

In the timepiece 1, when the rotation position different from the reference rotation position corresponds to the high-load rotation position and the reference rotation position corresponds to the high-load rotation position, the energy of the main drive signal is increased. Accordingly, in the timepiece 1, when the rotation position is different from the reference rotation position and the rotation load at the rotation position corresponding to the high-load rotation position is less than the rotation load at the high-load rotation position, the reference rotation position can be determined by the method with reference to FIG. 4.

In the timepiece 1, when the rotation position different from the reference rotation position corresponds to the high-load rotation position and the reference rotation position does not correspond to the high-load rotation position, the energy of the main drive signal is maintained. Accordingly, in the timepiece 1, when the rotor 202 rotates in the forward-rotation or reverse-rotation direction due to impact applied to the timepiece 1 and the original reference rotation position has shifted, a process for detecting the original reference rotation position by outputting the chopper signal without unnecessarily increasing the energy of the main drive signal is executed. That is, in the timepiece 1, since the energy of the main drive signal is not increased unnecessarily, power consumption can be suppressed.

In the timepiece 1, when the rotation position of the wheel continuously exceeds the predetermined number and corresponds to the high-load rotational position, the energy of the main drive signal is increased. Accordingly, in the timepiece 1, the rotor 202 can be reliably rotated 180 degrees in the forward-rotation direction even at the rotation position where the high-load rotation position is continuous.

All or some of the functions of the timepiece 1 described above may be recorded as a program on a computer-readable recording medium, and this program may be executed by a computer system. The computer system includes an OS and hardware such as peripheral devices. The computer-readable recording medium is, for example, a portable medium such as a flexible disk, a magneto-optical disk, a read only memory (ROM), and a CD-ROM, a storage device such as a hard disk built in a computer system, and a volatile memory (Random Access Memory: RAM) provided by a server on a network such as the Internet. The volatile memory is an example of a recording medium that holds a program for a certain period of time.

The program described above may be transmitted to another computer system through a transmission medium, for example, a network such as the Internet or a communication line such as a telephone line.

Further, the program may be a program that realizes all or some of the functions described above. The program that realizes some of the functions described above may be a program that can realize the functions described above in combination with a program recorded in advance in a computer system, that is, a so-called differential program.

Thus, the embodiment of the present disclosure has been described with reference to the drawings, but the specific configuration thereof is not limited to the embodiment described above, and includes design changes and the like within a scope not departing from the gist of the present disclosure.

What is claimed is:

1. A timepiece comprising:
a high-load rotation position detection circuit that, during a first rotation of a wheel, detects a first high-load rotation position that is a first rotation position of the wheel when a rotational load of a rotor that transmits rotor's rotation to the wheel to rotate a pointer clockwise is greater than that during normal hand movement; and
a drive signal output circuit that, during a second rotation of the wheel subsequent to the first rotation of the wheel, outputs a sub-drive signal instead of a main drive signal when the rotation position of the wheel is at the first high-load rotation position, wherein the sub-drive signal has energy greater than that of the main drive signal that is output during the normal hand movement and less than that an auxiliary drive signal that is output when the rotor does not rotate by the main drive signal.

2. The timepiece according to claim 1, further comprising a rotation detection control circuit that stops a rotation detection process for detecting a rotation state of the rotor based on an induced voltage output to a coil that generates magnetic flux for rotating the rotor when the rotation position of the wheel is at the first high-load rotation position.

3. The timepiece according to claim 2,
wherein the drive signal output circuit increases energy of the main drive signal when a rotation position different from a reference rotation position corresponds to the first high-load rotation position and the reference rotation position corresponds to a second high-load rotation position.

4. The timepiece according to claim 2,
wherein the drive signal output circuit maintains energy of the main drive signal when a rotation position different from a reference rotation position corresponds to the first high-load rotation position and the reference rotation position does not correspond to a second high-load rotation position.

5. The timepiece according to claim 2,
wherein the drive signal output circuit increases energy of the main drive signal when the first high-load rotation position of the wheel is determined to be a high-load rotation position more than a predetermined number of times.

6. The timepiece according to claim 1,
wherein the drive signal output circuit increases energy of the main drive signal when a rotation position different from a reference rotation position corresponds to the first high-load rotation position and the reference rotation position corresponds to a second high-load rotation position.

7. The timepiece according to claim 1,
wherein the drive signal output circuit maintains energy of the main drive signal when a rotation position different from a reference rotation position corresponds to the first high-load rotation position and the reference rotation position does not correspond to a second high-load rotation position.

8. The timepiece according to claim 1,
wherein the drive signal output circuit increases energy of the main drive signal when the first high-load rotation position of the wheel is determined to be a high-load rotation position more than a predetermined number of times.

9. The timepiece according to claim 1, further comprising:
a memory,
wherein the high-load rotation position detection circuit, during the first rotation of the wheel, stores in the memory, the first high-load rotation position of the wheel, and
wherein the drive signal output circuit, during the second rotation of the wheel, determines that the rotation position of the wheel is at the first high-load rotation position based on the first high-load rotation position stored in the memory.

10. A timepiece motor control method comprising:
during a first rotation of a wheel, detecting a first high-load rotation position that is a rotation position of the wheel when a rotational load of a rotor that transmits the rotor's rotation to the wheel to rotate a pointer clockwise is greater than that during normal hand movement; and
during a second rotation of the wheel subsequent to the first rotation of the wheel, outputting a sub-drive signal instead of a main drive signal when the rotation position of the wheel is at the first high-load rotation position, wherein the sub-drive signal has energy greater than that of the main drive signal that is output during the normal hand movement and less than that of an auxiliary drive signal that is output when the rotor does not rotate by the main drive signal.

11. The timepiece motor control method according to claim 10, further comprising:
outputting the main drive signal when the rotation position of the wheels is at a rotation position other than the first high-load rotation position;
determining that the rotor has not successfully rotated in response to outputting the main drive signal; and
outputting the auxiliary drive signal in response to determining that the rotor has not successfully rotated.

12. The timepiece motor control method according to claim 10, further comprising:
during the first rotation of the wheel, storing in a memory the first high-load rotation position of the wheel; and
during the second rotation of the wheel, determining that the rotation position of the wheel is at the first high-load rotation position based on the first high-load rotation position stored in the memory.

* * * * *